US008447938B2

(12) United States Patent
Drews et al.

(10) Patent No.: US 8,447,938 B2
(45) Date of Patent: May 21, 2013

(54) BACKING UP A DEDUPLICATED FILESYSTEM TO DISJOINT MEDIA

(75) Inventors: Clemens Drews, San Jose, CA (US); Mark Andrew Smith, Los Gatos, CA (US)

(73) Assignee: International Business Machines Corporation, Armonk, NY (US)

( * ) Notice: Subject to any disclaimer, the term of this patent is extended or adjusted under 35 U.S.C. 154(b) by 996 days.

(21) Appl. No.: 11/969,517

(22) Filed: Jan. 4, 2008

(65) Prior Publication Data
US 2009/0177855 A1 Jul. 9, 2009

(51) Int. Cl.
G06F 12/00 (2006.01)
G06F 13/00 (2006.01)
G06F 13/28 (2006.01)

(52) U.S. Cl.
USPC ............... 711/162; 711/173; 711/E12.001; 711/E12.028

(58) Field of Classification Search
USPC ............... 711/162, 173, E12.001, E12.028
See application file for complete search history.

(56) References Cited

U.S. PATENT DOCUMENTS

| | | | | |
|---|---|---|---|---|
| 5,987,506 A * | 11/1999 | Carter et al. | ............ | 709/213 |
| 6,047,294 A | 4/2000 | Deshayes et al. | | |
| 6,065,065 A * | 5/2000 | Murakami et al. | ............ | 709/250 |
| 6,374,363 B1 | 4/2002 | Wu et al. | | |
| 6,542,975 B1 | 4/2003 | Evers et al. | | |
| 6,675,177 B1 | 1/2004 | Webb | | |
| 6,788,302 B1 * | 9/2004 | Ditlow et al. | ............ | 345/505 |
| 7,155,465 B2 | 12/2006 | Lee et al. | | |
| 7,222,143 B2 | 5/2007 | Childs et al. | | |
| 7,672,981 B1 * | 3/2010 | Faibish et al. | ......... | 707/999.204 |
| 7,689,566 B1 * | 3/2010 | Nieuwejaar et al. | ..... | 707/999.01 |
| 7,797,279 B1 * | 9/2010 | Starling et al. | ............ | 707/641 |
| 2003/0158836 A1 * | 8/2003 | Venkatesh et al. | ............ | 707/1 |
| 2004/0015522 A1 * | 1/2004 | Hensbergen | ............ | 707/204 |
| 2004/0164252 A1 * | 8/2004 | Yonekawa | ............ | 250/484.4 |
| 2006/0089950 A1 * | 4/2006 | Tormasov et al. | ............ | 707/200 |
| 2007/0088702 A1 * | 4/2007 | Fridella et al. | ............ | 707/10 |
| 2007/0136723 A1 * | 6/2007 | Smith et al. | ............ | 718/1 |
| 2007/0204011 A1 * | 8/2007 | Shaver et al. | ............ | 709/219 |
| 2007/0250519 A1 | 10/2007 | Fineberg et al. | | |
| 2007/0250674 A1 | 10/2007 | Fineberg et al. | | |
| 2008/0244172 A1 * | 10/2008 | Kano | ............ | 711/112 |
| 2008/0294696 A1 * | 11/2008 | Frandzel | ............ | 707/200 |
| 2009/0132616 A1 * | 5/2009 | Winter et al. | ............ | 707/204 |
| 2011/0035422 A1 * | 2/2011 | Yasoshima | ............ | 707/822 |
| 2011/0276611 A1 * | 11/2011 | Verma et al. | ............ | 707/826 |
| 2012/0117111 A1 * | 5/2012 | Farber et al. | ............ | 707/770 |

OTHER PUBLICATIONS

L. You, et al: "Deep Store: An Archival Storage System Architecture", Proceedings of the 21st International Conference on Data Engineering (ICDE 2005)Tokyo, Japan Apr. 5-8, 2005, Piscataway, NJ, USA IEEE, pp. 804-815.

(Continued)

Primary Examiner — Sheng-Jen Tsai
(74) Attorney, Agent, or Firm — Leonard T. Guzman; Mohammed Kashef

(57) ABSTRACT

The present invention provides a method and system of backing up a de-duplicated computer file-system of a computer system. In an exemplary embodiment, the method and system include (1) dividing the file-system into partitions and (2) storing each of the partitions on a separate storage medium.

10 Claims, 16 Drawing Sheets

OTHER PUBLICATIONS

D. Bhagwat, et al: "Providing High Reliability in a Minimum Redundancy Archival Storage System", Proceedings of the 14th IEEE International Symposium on Modeling, Analysis, and Simulation of Computer and Telecommunication Systems (MASCOTS '06) Sep. 14, 2006, pp. 413-421.

L. You, et al: "Evaluation of Efficient Archival Storage Techniques", Internet Citation, {Online] Retrieved from the Internet: URL:http://www.karamanolis.org/christos/papers/msst04.pdf> [retrieved on Apr. 1, 2004] Sections 3.3, 3.4 and 4, 6 pages.

A. Muthitacharoen, et al: "A Low-Bandwidth Network File System", Proceedings of the ACM Symposium on Operating Systemsprinciples, ACM SOSP, US, Oct. 21, 2002, pp. 174-187.

Snelting, G. et al.; 2006—Efficient Path Conditions in Dependence Graphs for Software Safety Analysis.

Vitter, JS. et al.; 2001—External Memory Algorithms and Data Structures.

\* cited by examiner

BACKING UP A DEDUPLICATED FILESYSTEM TO DISJOINT MEDIA

FIELD OF THE INVENTION

The present invention relates to computer systems, and particularly relates to a method and system of backing up a de-duplicated computer file-system of a computer system.

BACKGROUND OF THE INVENTION

A computer system typically includes a computer file-system. The file-system could be a de-duplicated file-system. Problems with Backing Up De-Duplicated File-Systems Computer systems (e.g. server computer systems) need the ability to perform efficient data de-duplication on data. Backup solutions for computer file-system have been including some form of data "de-duplication" or data "redundancy elimination" algorithms. These algorithms can be used at the whole-file or at the sub-file level.

One of the most common approaches to sub-file de-duplication is to first break data streams (files) into chunks using a data fingerprinting algorithm, such as Rabin fingerprinting. Data fingerprinting algorithms can be set to produce chunks of an "expected size" based on parameters of the algorithm. Once the files are in chunks, a hashing algorithm is used to uniquely identify the content of each of those chunks. These unique identifiers are then placed into a queryable index. When a chunk is found which already exists in the file-system (found by querying the index or attempting an insert and getting a collision), that chunk can be replaced by a reference to that chunk, and "de-duplication" occurs. For each file that is chunked, a "blueprint" or chunk list is produced identifying how to reconstruct the file from its constituent parts.

One issue with this type of de-duplicated file-system is that the data storage format makes it very difficult to maintain this de-duplicated state when backing up to disjoint storage media (e.g., tape systems). Because of the interconnected nature of the data (object "blueprints" refer to multiple chunks, and de-duplicated chunks point back to multiple objects), backing up a de-duplicated system to disjoint storage media is difficult. Reading a single object may require mounting multiple storage media in order to read the data for the object.

PRIOR ART SYSTEMS

For this reason, prior art systems for backing up de-duplicated file-systems to disjoint storage media re-duplicate the data so that the referential locality of the data is maintained. However, such systems, as shown in prior art FIG. 1, are unable to backup de-duplicated file-systems to disjoint media while maintaining the de-duplicated state of the file-system and maintaining referential locality. Currently, prior art systems require the unmounting/remounting of disjoint storage media in order to access all of the de-duplicated file data.

Therefore, a method and system of backing up a de-duplicated computer file-system of a computer system is needed.

SUMMARY OF THE INVENTION

The present invention provides a method and system of backing up a de-duplicated computer file-system of a computer system. In an exemplary embodiment, the method and system include (1) dividing the file-system into partitions and (2) storing each of the partitions on a separate storage medium.

In an exemplary embodiment, the dividing includes using a graph partitioning algorithm. In an exemplary embodiment, the using includes partitioning the file-system into sub-graphs with no interconnectivity.

In an exemplary embodiment, the partitioning includes, if a sub-graph among the sub-graphs cannot be stored entirely on the separate storage medium, (a) identifying the data that causes the sub-graph to be connected and (b) re-duplicating the data that causes the sub-graph to be connected. In an exemplary embodiment, the partitioning further includes saving the re-duplicated data with all referencing graph partitions.

In an exemplary embodiment, the identifying includes finding the minimum set of chunks of the data that causes the sub-graph to be connected. In an exemplary embodiment, the identifying includes selecting the chunks of the data with high reference counts.

In an exemplary embodiment, the storing includes combining the partitions on separate storage media until each of the media is full. In an exemplary embodiment, the storing includes saving the partitions on separate storage media with minimized amounts of graph interconnectivity among the partitions. In an exemplary embodiment, the saving includes (a) accounting for the number of separate storage media that can be mounted simultaneously on the computer system and (b) considering the performance penalty for the dismounting and remounting of the separate storage media.

The present invention also provides a computer program product usable with a programmable computer having readable program code embodied therein of backing up a de-duplicated computer file-system of a computer system. In an exemplary embodiment, the computer program product includes (1) computer readable code for dividing the file-system into partitions and computer readable code for storing each of the partitions on a separate storage medium.

THE FIGURES

DETAILED DESCRIPTION OF THE INVENTION

The present invention provides a method and system of backing up a de-duplicated computer file-system of a computer system. In an exemplary embodiment, the method and system include (1) dividing the file-system into partitions and (2) storing each of the partitions on a separate storage medium.

Figure 1:
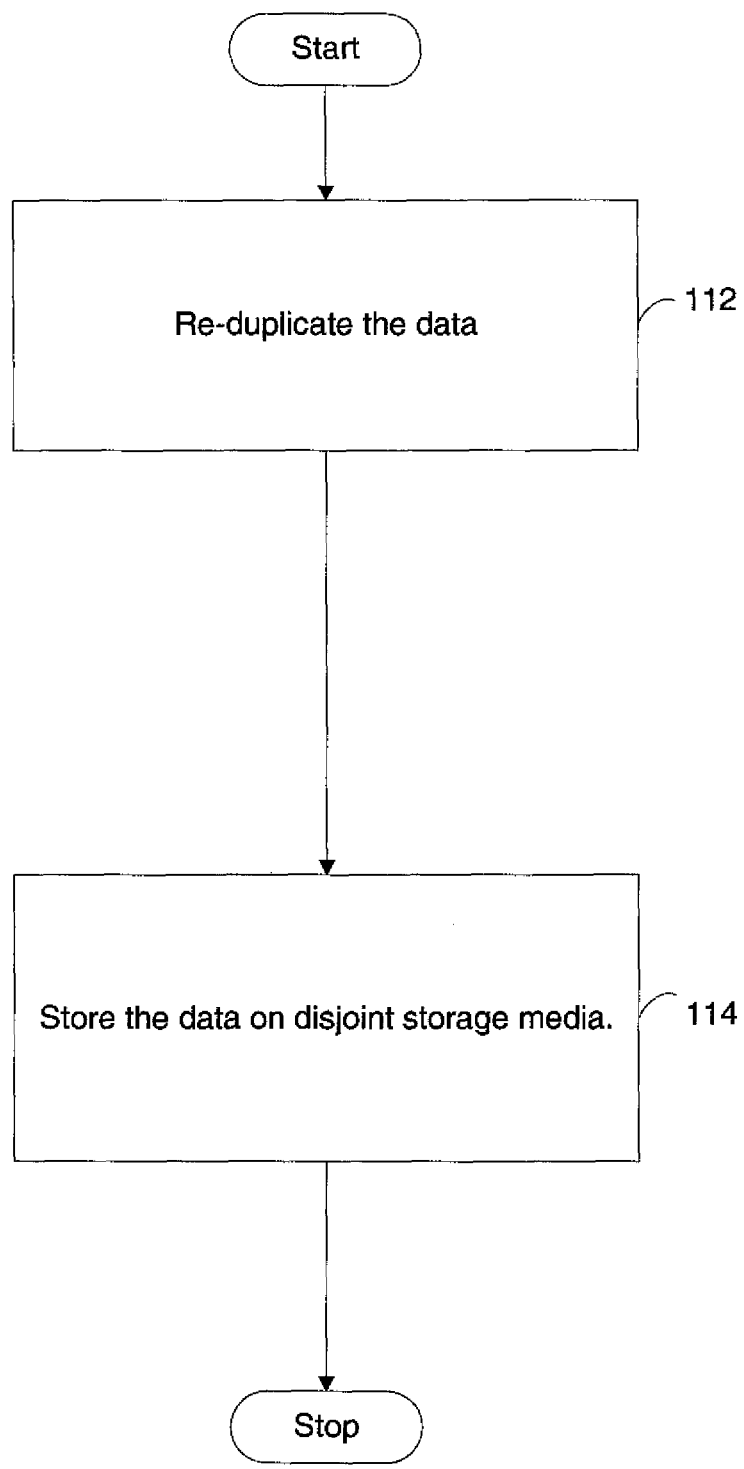
FIG. 1 is a flowchart of a prior art technique.
Figure 2:
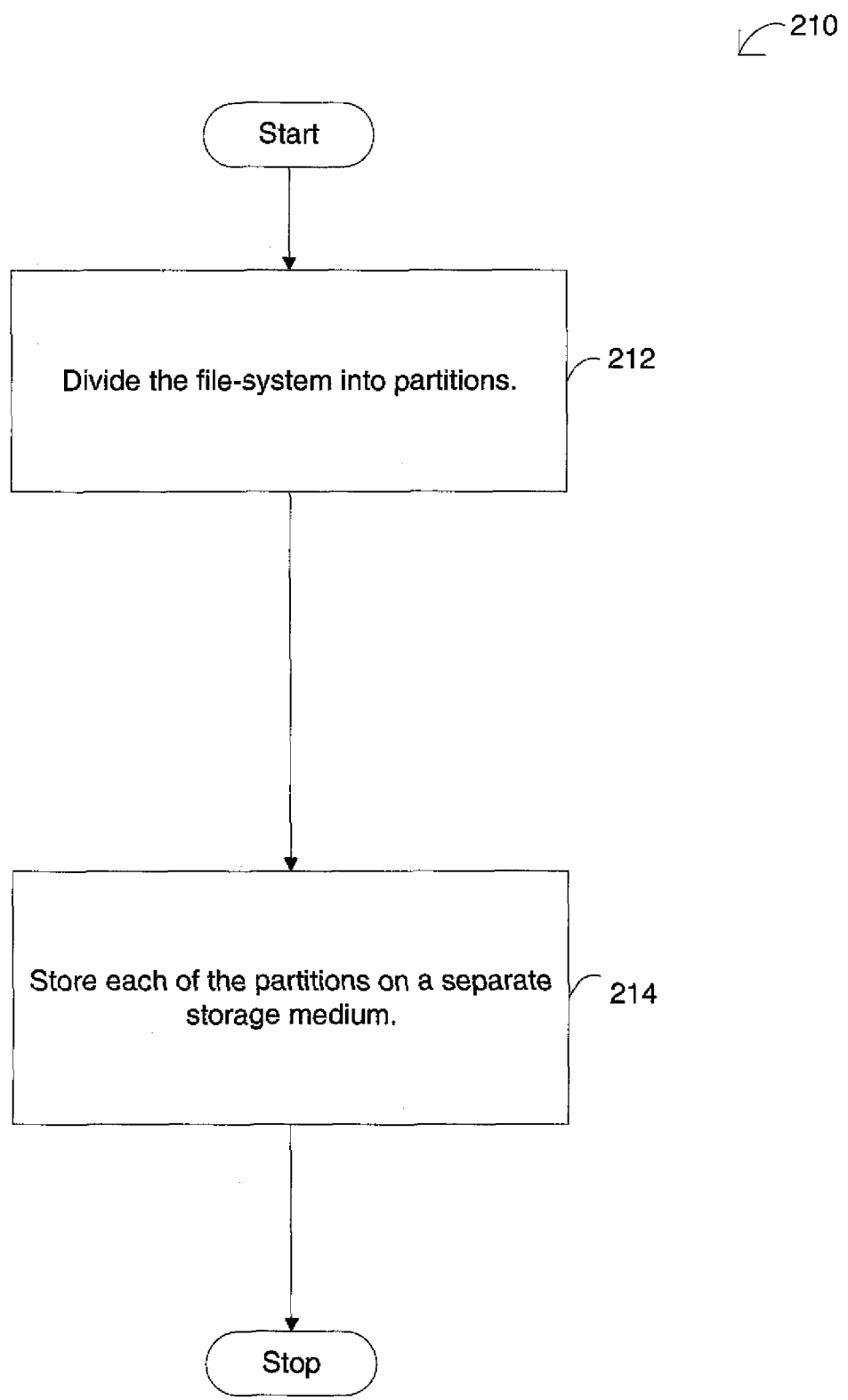
FIG. 2 is a flowchart in accordance with an exemplary embodiment of the present invention.

Referring to FIG. 2, in an exemplary embodiment, the present invention includes a step 212 of dividing the file-system into partitions and a step 214 of storing each of the partitions on a separate storage medium. The present invention maintains the de-duplicated state of the file-system as much as possible. The file-system stores objects (e.g., computer files). Each object includes at least one chunk of data. The storage medium could be a magnetic storage medium (e.g., a tape) or an optical storage medium (e.g., a DVD). In an exemplary embodiment, storing step 214 does not need to refer to pieces of data on other storage media.

Dividing the File-System

Figure 3A:
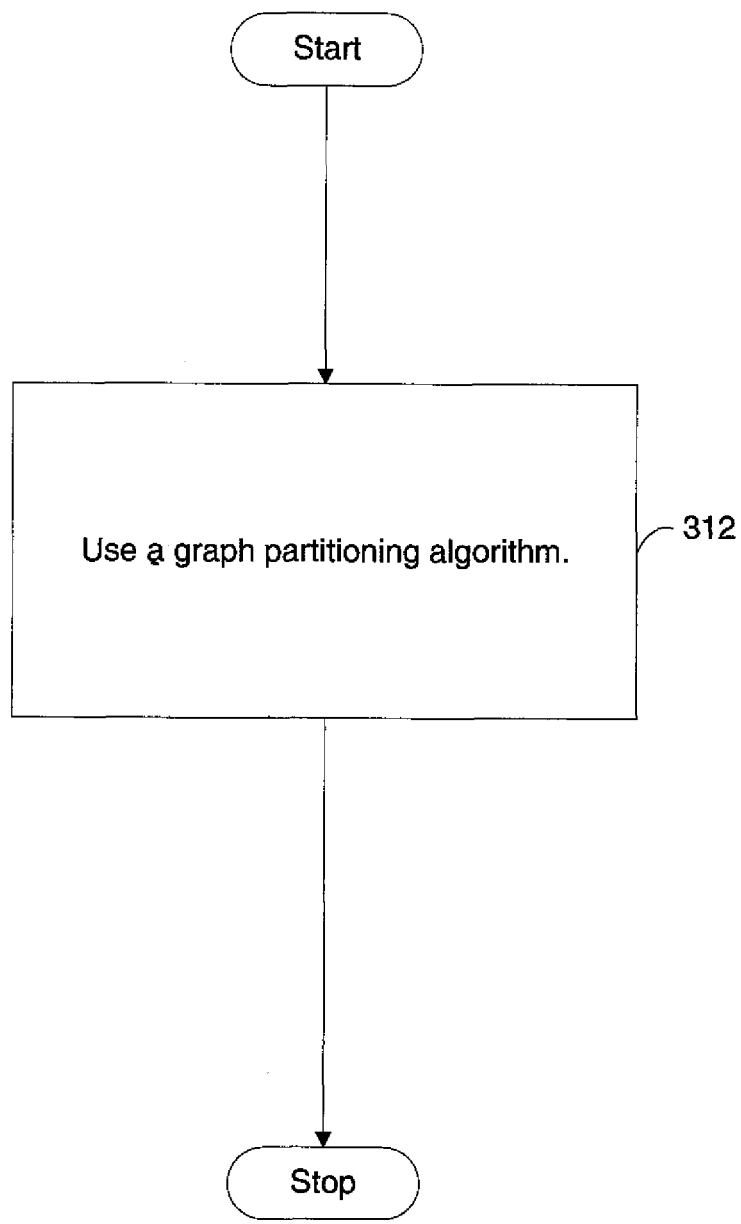
FIG. 3A is a flowchart in the dividing step in accordance with an exemplary embodiment of the present invention.

Referring to FIG. 3A, in an exemplary embodiment, dividing step 212 includes a step 312 of using a graph partitioning algorithm. For example, the present invention could use Dijkstra's algorithm. The present invention looks at the de-duplicated file-system as a bi-partite (two-level) graph, with objects connected to their constituent chunks, and chunks connected back to their member objects.

Sub-Graphs with No Interconnectivity

Figure 3B:
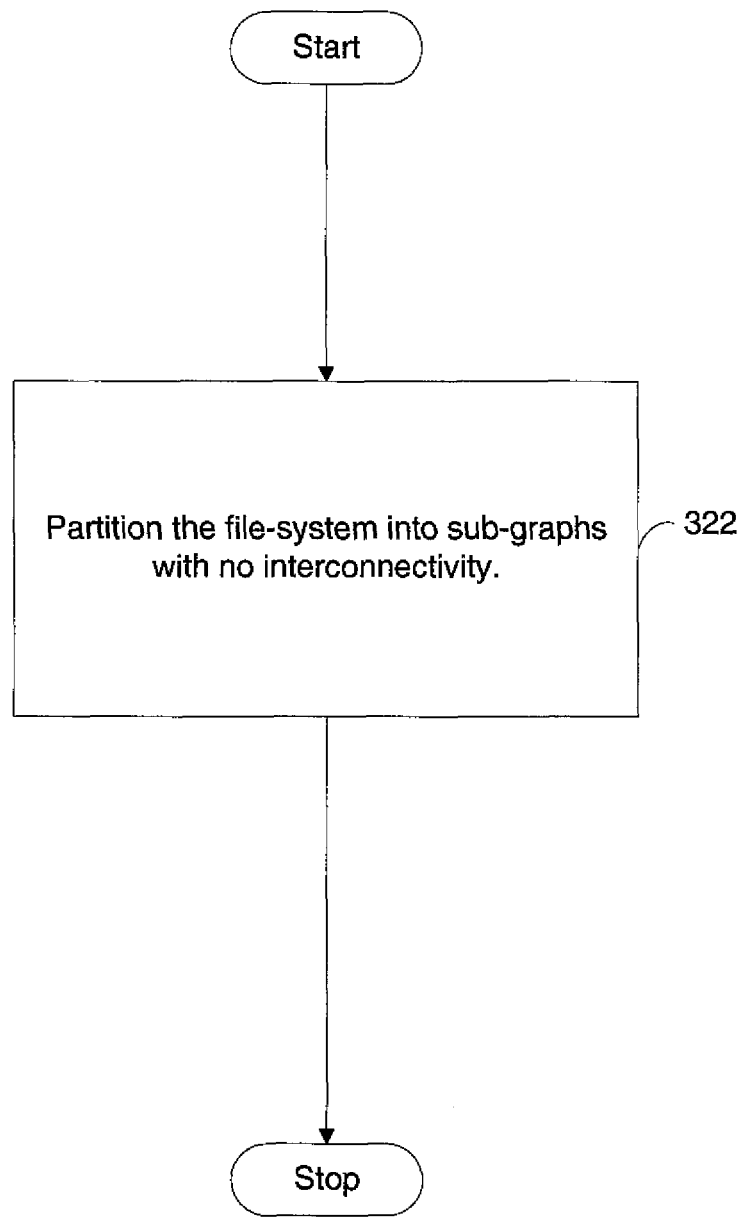
FIG. 3B is a flowchart of the using step in accordance with an exemplary embodiment of the present invention.

Referring to FIG. 3B, in an exemplary embodiment, using step 312 includes a step 322 of partitioning the file-system into sub-graphs with no interconnectivity. In an exemplary embodiment, the sub-graphs are partitions.

Figure 3C:
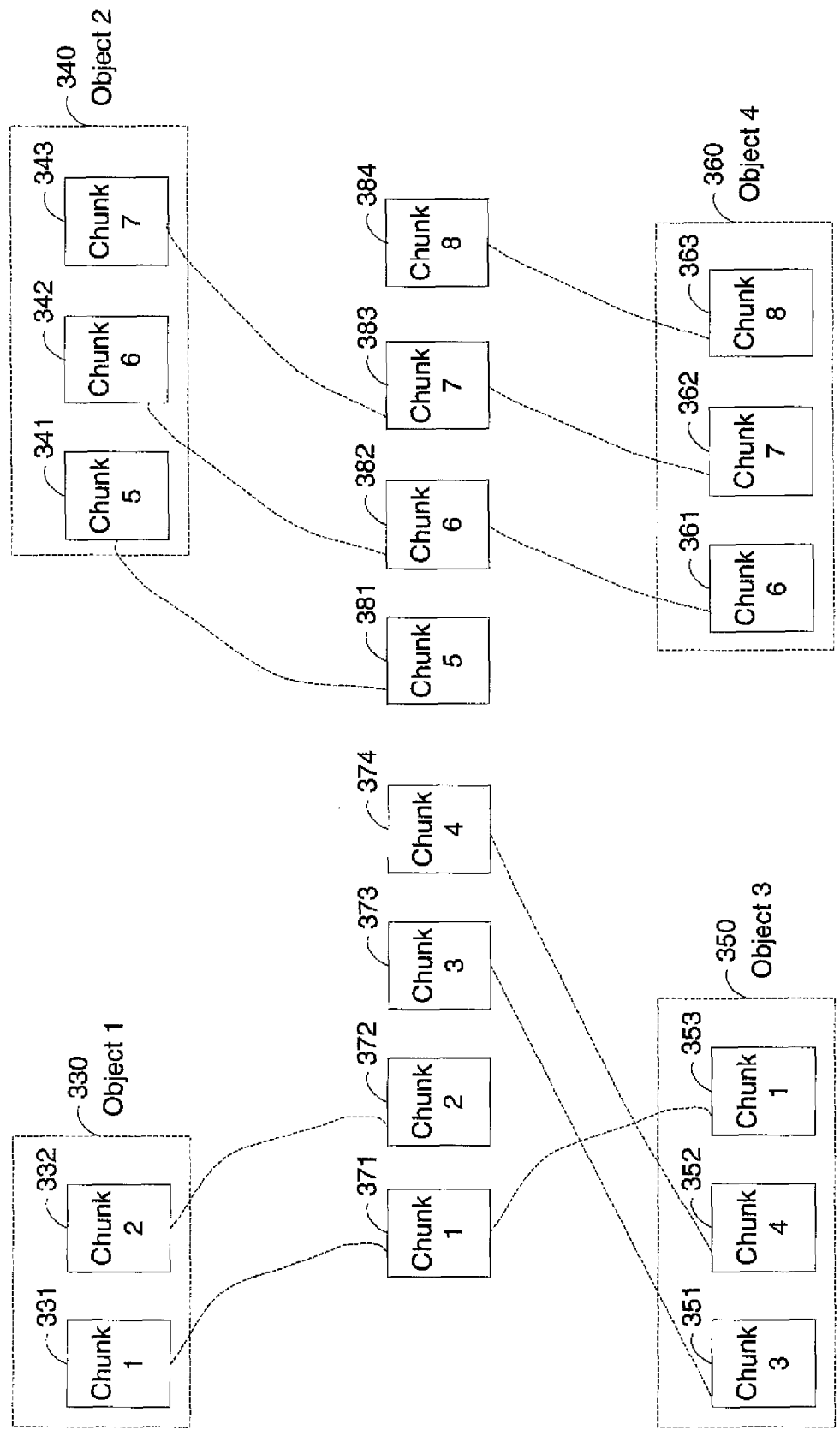
FIG. 3C is a diagram of a de-duplicated system.
Figure 3D:
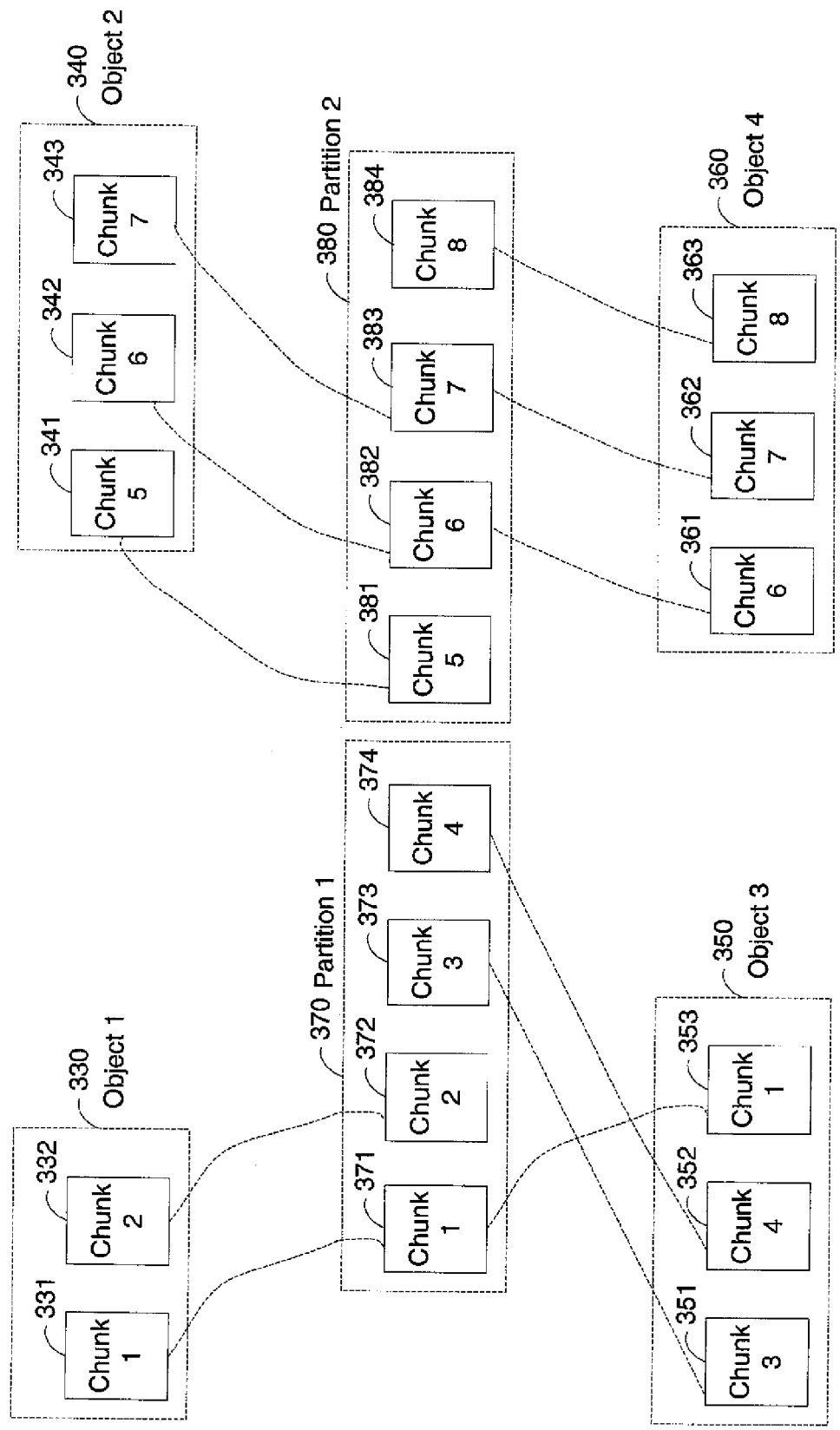
FIG. 3D is a diagram of a backed-up de-duplicated system in accordance with an exemplary embodiment of the present invention.

Referring to FIG. 3C, the de-duplicated file-system, for example, includes an object 1 (item 330) that includes chunks 1 and 2 (items 331 and 332, respectively), an object 3 (item 350) that includes chunks 3, 4, and 1 (items 351, 352, and 353, respectively), an object 2 (item 340) that consists of chunks 5, 6, and 7 (items 341, 342, and 343, respectively), and an object 4 (item 360) that consists of chunks 6, 7, and 8 (items 361, 362, and 363, respectively). As shown in FIG. 3C, the de-duplicated file-system includes a chunk 1 (item 371) that is referenced by items 331 and 353, a chunk 2 (item 372) that is referenced by item 332, a chunk 3 (item 373) that is referenced by item 351, a chunk 4 (item 374) that is referenced by item 352, a chunk 5 (item 381) that is referenced by item 341, a chunk 6 (item 382) that is referenced by items 342 and 361, a chunk 7 (item 383) that is referenced by items 343 and 362, and a chunk 8 (item 384) that is referenced by item 363. Referring to FIG. 3D, in an exemplary embodiment, partitioning step 322 partitions the de-duplicated file-system shown in FIG. 3C into a partition 1 (item 370) (a sub-graph) and a partition 2 (item 380) (another sub-graph), such that partition 1 (item 370) and partition 2 (item 380) have no interconnectivity.

Sub-Graphs with Interconnectivity

Figure 4A:
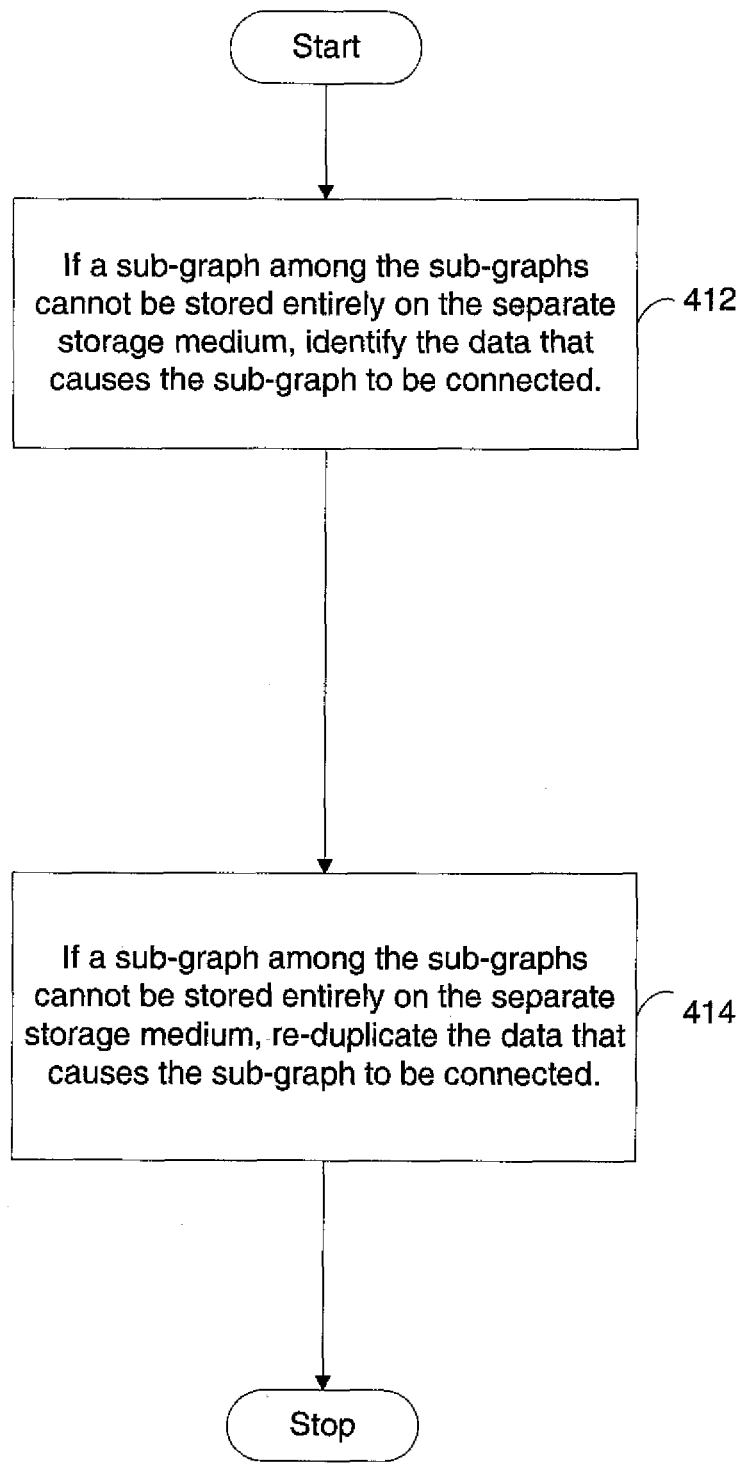
FIG. 4A is a flowchart of the partitioning step in accordance with an exemplary embodiment of the present invention.

Referring to FIG. 4A, in an exemplary embodiment, partitioning step 322 includes, if a sub-graph among the sub-graphs cannot be stored entirely on the separate storage medium, a step 412 of identifying the data that causes the sub-graph to be connected and a step 414 of re-duplicating the data that causes the sub-graph to be connected. In an exemplary embodiment, a sub-graph is sufficiently small if it can fit on a separate storage medium. For a graph that cannot be completely separated or that is not small enough to fit on a separate storage medium, the pieces of data that cause the sub-graphs of the graph to be connected can be identified and re-duplicated for storage with each referencing graph partition.

Figure 4B:
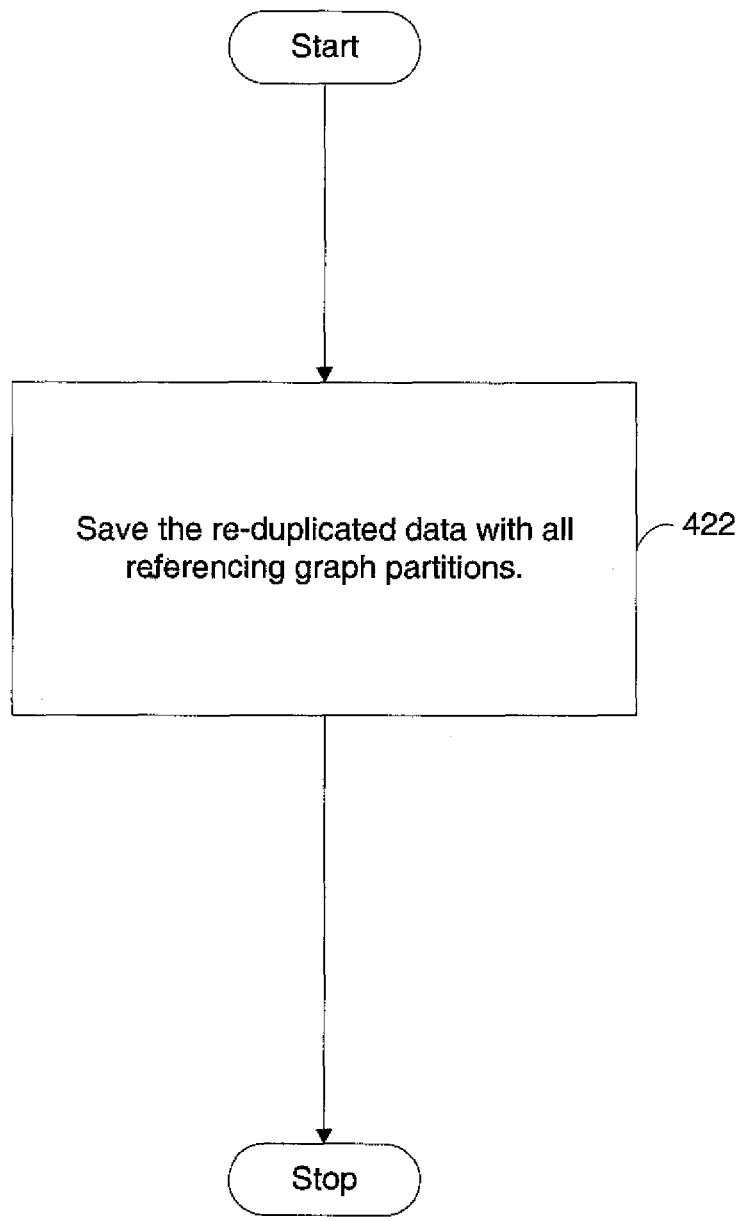
FIG. 4B is a flowchart of the partitioning step in accordance with a further embodiment of the present invention.

Referring to FIG. 4B, in an exemplary embodiment, partitioning step 322 further includes a step 422 of saving the re-duplicated data with all referencing graph partitions. In an exemplary embodiment, the present invention saves the re-duplicated data to the backup target. Each graph partition can be stored on separate media (e.g, an individual magnetic storage medium (e.g., tape) or an individual optical storage medium (e.g., DVD), and each graph partition will refer only to data contained on the separate piece of media on which that graph partition resides.

Figure 4C:
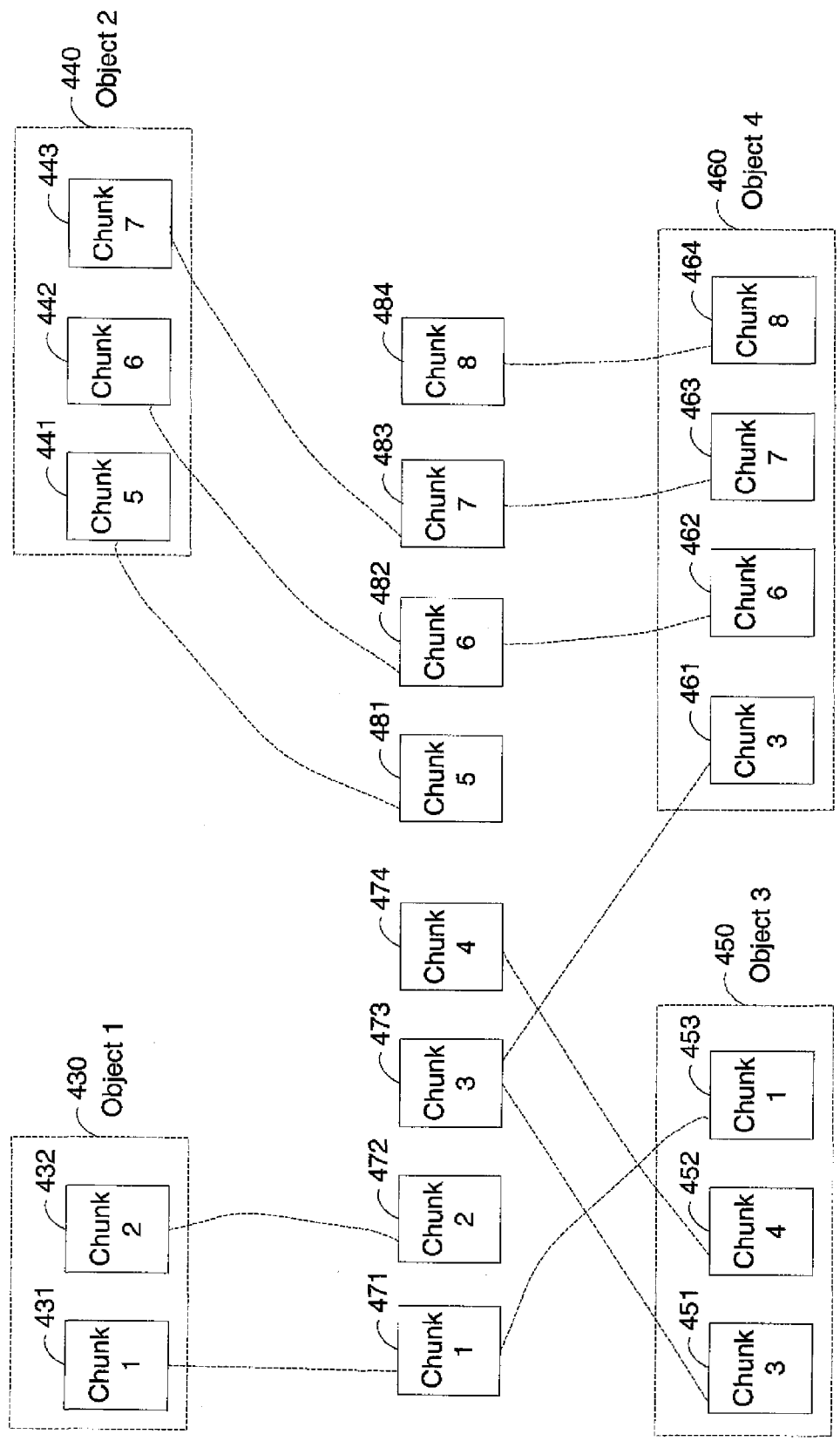
FIG. 4C is a diagram of a de-duplicated system.
Figure 4D:
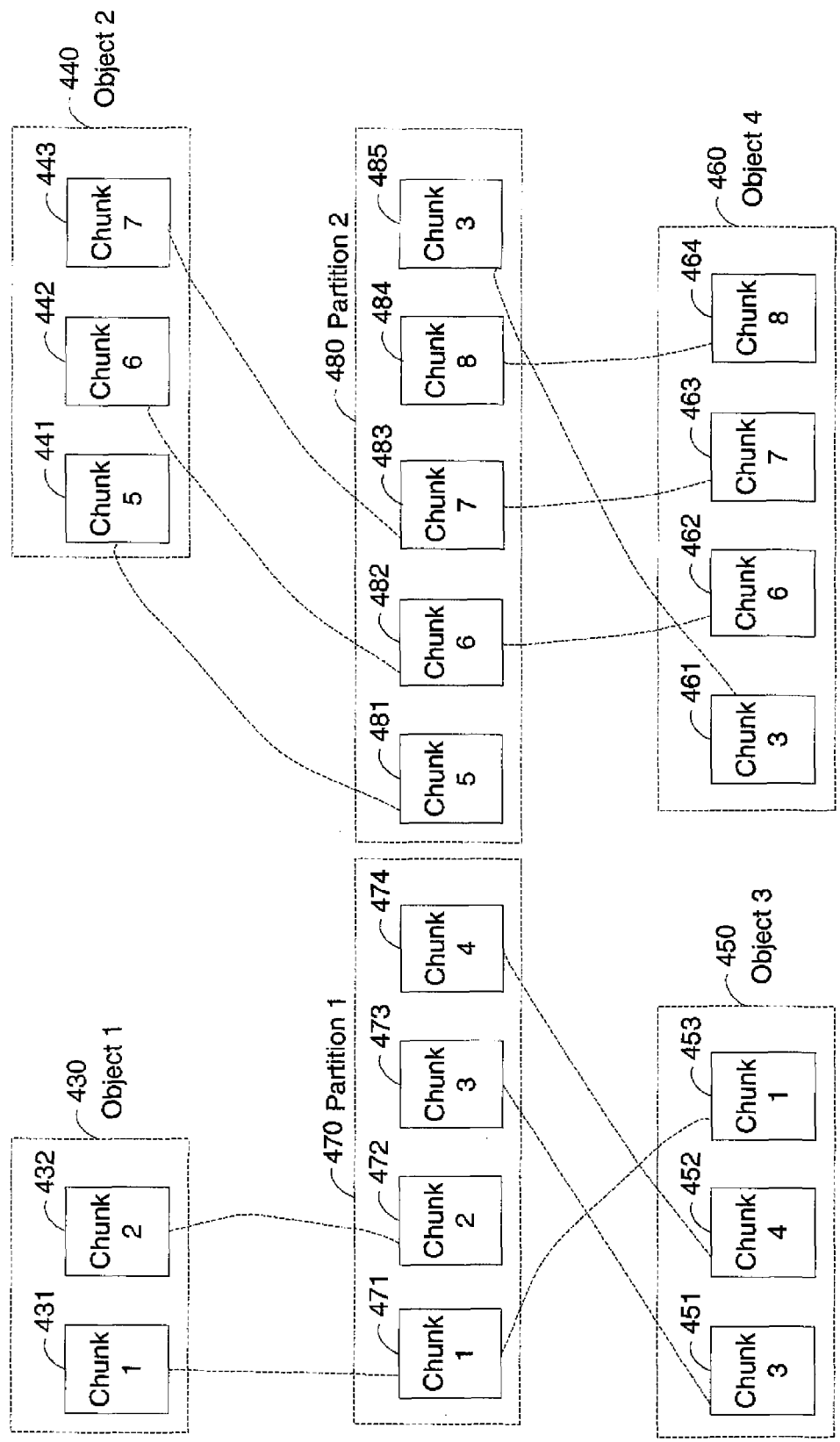
FIG. 4D is a diagram of a backed-up de-duplicated system in accordance with an exemplary embodiment of the present invention.

Referring to FIG. 4C, the de-duplicated file-system, for example, includes an object 1 (item 430) that includes chunks 1 and 2 (items 431 and 432, respectively), an object 3 (item 450) that includes chunks 3, 4, and 1 (items 451, 452, and 453, respectively), an object 2 (item 440) that consists of chunks 5, 6, and 7 (items 441, 442, and 443, respectively), and an object 4 (item 460) that consists of chunks 3, 6, 7, and 8 (items 461, 462, 463, and 464, respectively). As shown in FIG. 4C, the de-duplicated file-system includes a chunk 1 (item 471) that is referenced by items 341 and 453, a chunk 2 (item 472) that is referenced by item 432, a chunk 3 (item 473) that is referenced by items 451 and 461 (an instance interconnectivity), a chunk 4 (item 474) that is referenced by item 452, a chunk 5 (item 481) that is referenced by item 441, a chunk 6 (item 482) that is referenced by items 442 and 462, a chunk 7 (item 483) that is referenced by items 443 and 463, and a chunk 8 (item 484) that is referenced by item 464. Referring to FIG. 4D, in an exemplary embodiment, even though the de-duplicated file-system in FIG. 4C includes the instance of interconnectivity resulting from chunk 3 (item 473) being referenced by both items 451 and 461, partitioning step 322 partitions the de-duplicated file-system shown in FIG. 4C into a partition 1 (item 470) (a sub-graph) and a partition 2 (item 480) (another sub-graph), such that partition 1 (item 470) and partition 2 (item 480) have no interconnectivity by re-duplicating item 473 into a chunk 3 (item 485) and allowing chunk 3 (item 485) to be referenced by item 461.

Identifying the Data

Figure 5A:
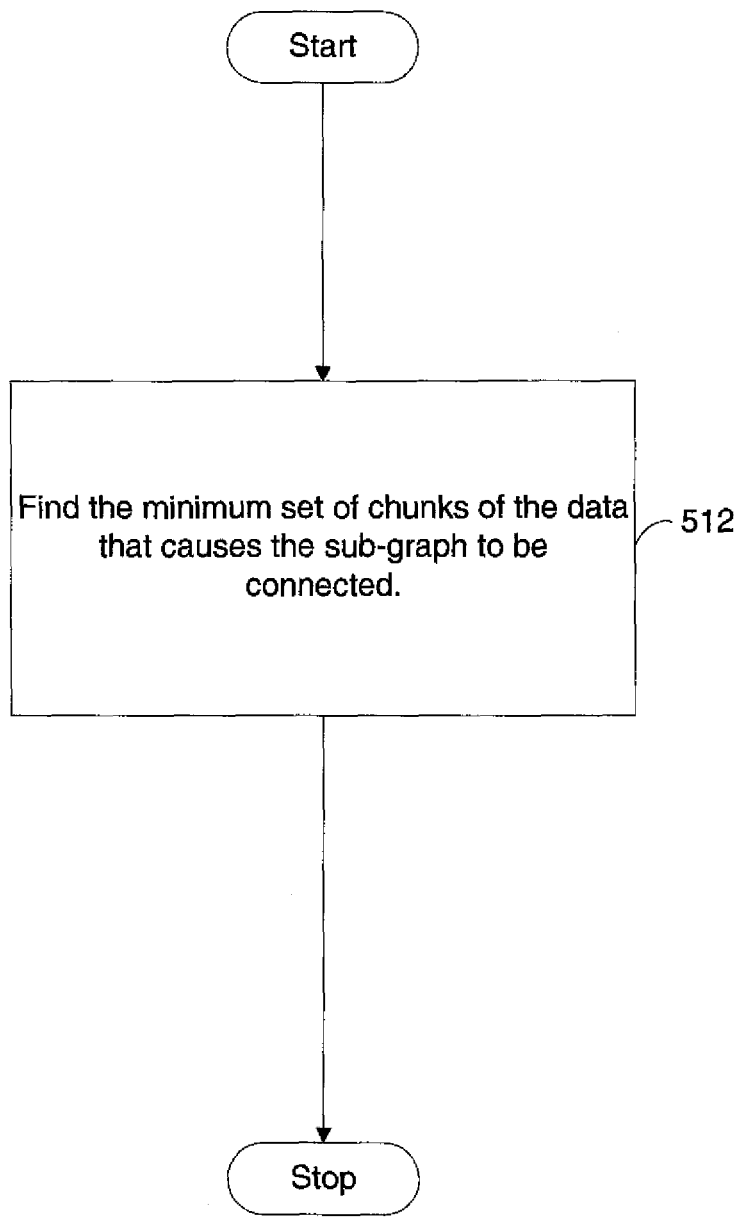
FIG. 5A is a flowchart of the identifying step in accordance with an exemplary embodiment of the present invention.
Figure 5B:
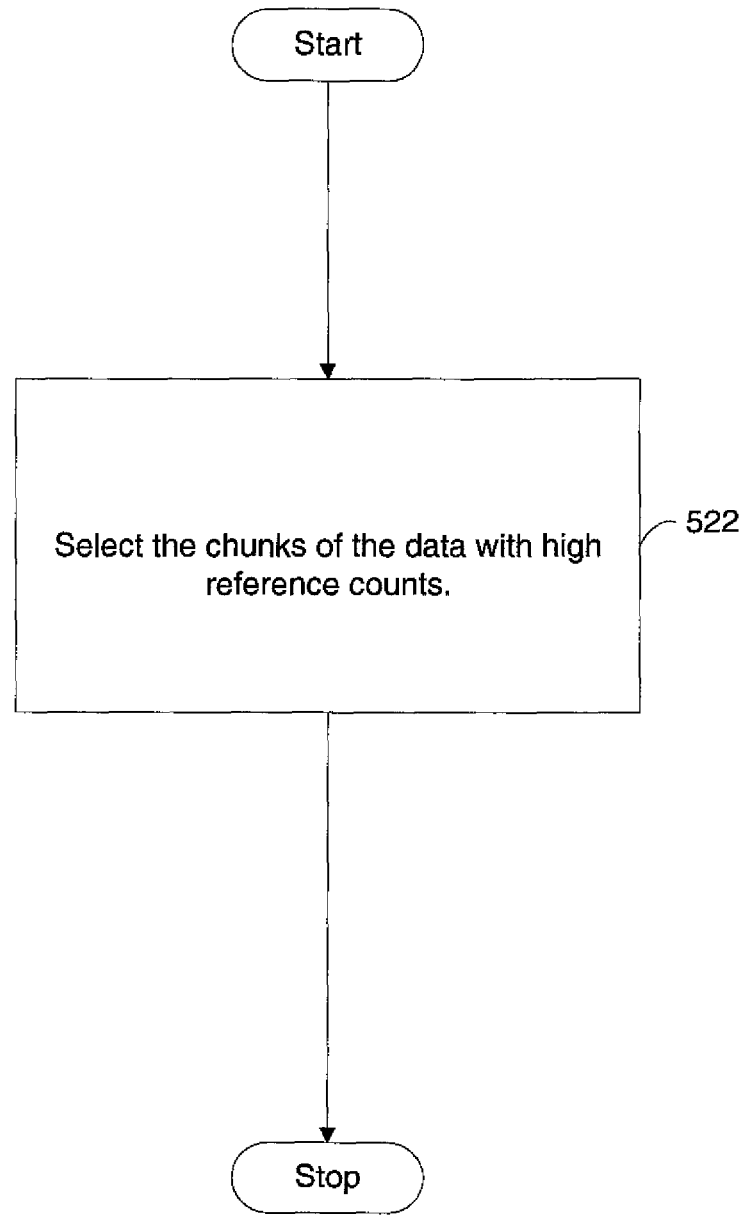
FIG. 5B is a flowchart of the identifying step in accordance with an exemplary embodiment of the present invention.

Referring to FIG. 5A, in an exemplary embodiment, identifying step 412 includes a step 512 of finding the minimum set of chunks of the data that causes the sub-graph to be connected. The present invention could perform the finding by using standard graph algorithms to find the minimum cut. The present invention could perform the finding by using a minimum-cut graph partitioning algorithm to find the minimum amount of the data that needs to be re-duplicated. Referring to FIG. 5B, in an exemplary embodiment, identifying step 412 includes a step 522 of selecting the chunks of the data with high reference counts. A reference count for a particular chunk of data is the count of the number of times that that chunk is referred to by the objects in the file-system. A reference count for a particular chunk of data is also the count of the number of files in the file-system that refer to that chunk.

Storing Each of the Partitions

Figure 6:
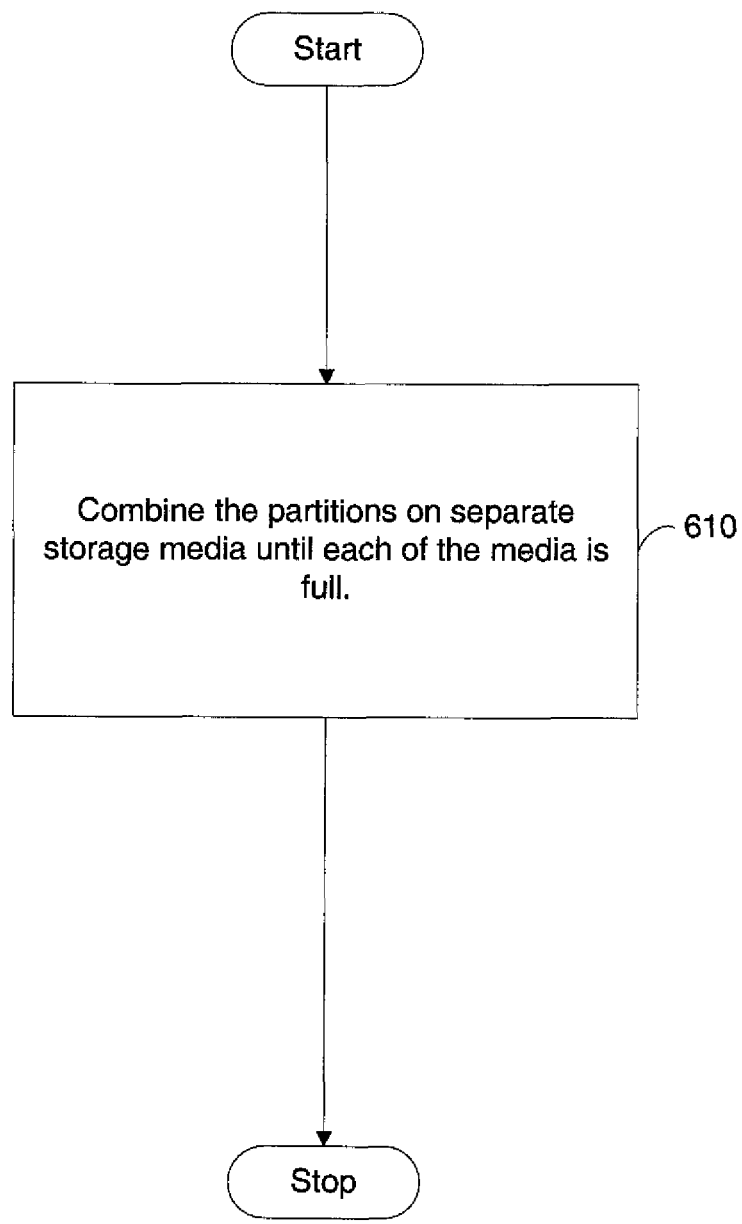
FIG. 6 is a flowchart of the storing step in accordance with an exemplary embodiment of the present invention.

Referring to FIG. 6, in an exemplary embodiment, storing step 214 includes a step 610 of combining the partitions on separate storage media until each of the media is full. The graph partitions could be combined on single instances of separate media until the media is full, but no partial partitions would be stored on a separate piece of media.

Figure 7A:
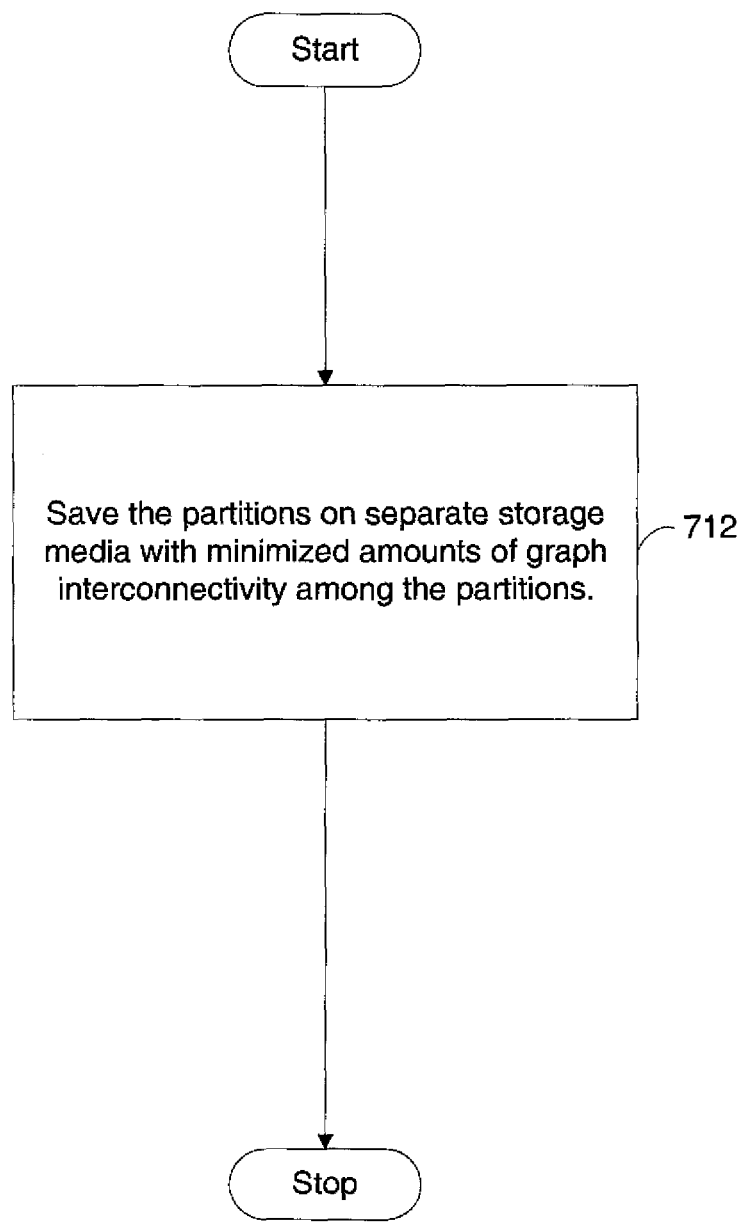
FIG. 7A is a flowchart of the storing step in accordance with an exemplary embodiment of the present invention.
Figure 7B:
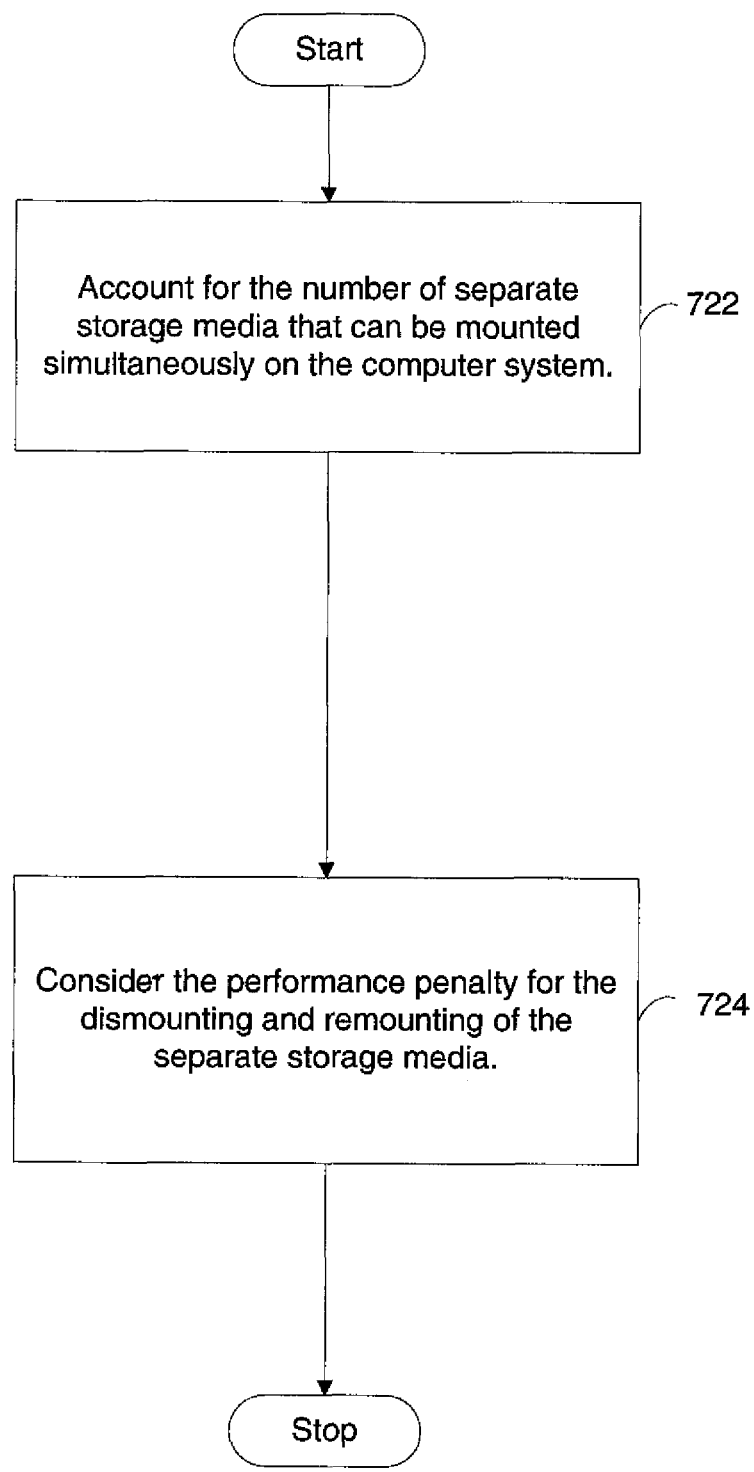
FIG. 7B is a flowchart of the saving step in accordance with an exemplary embodiment of the present invention.

Referring to FIG. 7A, in an exemplary embodiment, storing step 214 includes a step 712 of saving the partitions on separate storage media with minimized amounts of graph interconnectivity among the partitions. Referring to FIG. 7B, in an exemplary embodiment, saving step 712 includes a step 722 of accounting for the number of separate storage media that can be mounted simultaneously on the computer system and a step 724 of considering the performance penalty for the dismounting and remounting of the separate storage media. The present invention could tolerate minimized amounts of graph interconnectivity depending on (i) the number of disjoint media that can be mounted simultaneously and (ii) the performance penalty for dismounting and/or remounting separate media.

Transmitting

Figure 8:
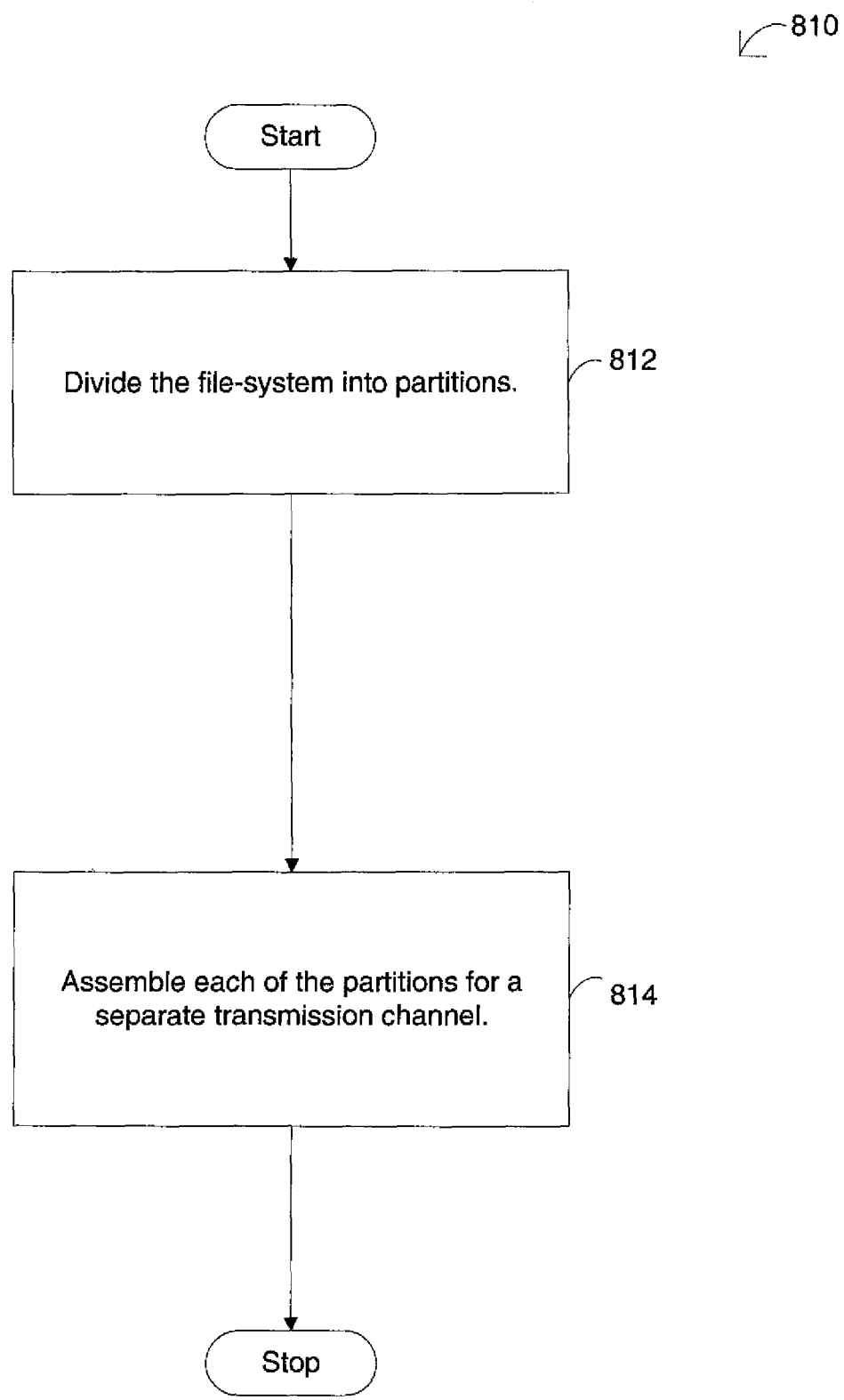
FIG. 8 is a flowchart in accordance with an exemplary embodiment of the present invention.

The present invention also provides a method and system of transmitting a de-duplicated computer file-system of a computer system. In an exemplary embodiment, the method and system include (1) dividing the file-system into partitions and (2) assembling each of the partitions for a separate transmission channel. Referring to FIG. 8, in an exemplary embodiment, the present invention includes a step 812 of dividing the file-system into partitions and a step 814 of assembling each of the partitions for a separate transmission channel.

General

The present invention can take the form of an entirely hardware embodiment, an entirely software embodiment, or an embodiment containing both hardware and software elements. In an exemplary embodiment, the present invention is implemented in software, which includes but is not limited to firmware, resident software, and microcode.

Furthermore, the present invention can take the form of a computer program product accessible from a computer-usable or computer-readable medium providing program code for use by or in connection with a computer system or any instruction execution system. The computer program product includes the instructions that implement the method of the present invention. A computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

A computer system suitable for storing and/or executing program code includes at least one processor coupled directly or indirectly to memory elements through a system bus. The memory elements include local memory employed during actual execution of the program code, bulk storage, and cache memories that provide temporary storage of at least some program code to reduce the number of times code is retrieved from bulk storage during execution. Input/output (I/O) devices (including but not limited to keyboards, displays, pointing devices, etc.) can be coupled to the computer system either directly or through intervening I/O controllers. Network adapters may also be coupled to the computer system in order to enable the computer system to become coupled to other computer systems or remote printers or storage devices through intervening private or public networks. Modems, cable modems, and Ethernet cards are just a few of the currently available types of network adapters. The computer system can also include an operating system and a compute file-system.

CONCLUSION

Having fully described a preferred embodiment of the invention and various alternatives, those skilled in the art will recognize, given the teachings herein, that numerous alternatives and equivalents exist which do not depart from the invention. It is therefore intended that the invention not be limited by the foregoing description, but only by the appended claims.

What is claimed is:

1. A method of backing up data stored in a deduplicated file system to disjoint media while maintaining a deduplicated state and referential locality, comprising:
   representing data files stored in a deduplicated filesystem as a bipartite graph of data chunks and file inodes, said representing such that a particular data chunk connected to a particular file inode in the bipartite graph represents that the particular data chunk is part of a file described by the particular file inode;
   partitioning the bipartite graph into a plurality of sub-graphs with no interconnectivity between the sub-graphs using a graph partitioning algorithm, said partitioning such that each sub-graph represents: a set of data chunks, and all file inodes that include data chunks in said set of data chunks; and
   storing the sets of data chunks and file inodes on storage media thereby backing up the file system, said storing such that all data chunks and file inodes represented by a single sub-graph are stored together on a single storage medium, and when the size of a particular set of data chunks and file inodes represented by a single sub-graph exceeds a single storage medium's storage capacity: identifying a subset of data chunks in said particular set to re-duplicate such that partitioning a new bipartite graph into a plurality of new sub-graphs representing said subset such that each new sub-graph represents a set of data chunks for at least one complete file object that does not exceed a single separate storage medium's storage capacity, and re-duplicating data chunks represented by the new sub-graphs, and storing the re-duplicated data chunks on at least one single separate storage medium such that all data chunks represented by a single sub-graph among the new sub-graphs are stored together on at least one single separate storage medium.

2. The method of claim 1, wherein storing comprises storing each set of data chunks represented by a single sub-graph on at least one single separate storage medium until the at least one single separate storage medium does not have storage capacity to store at least one additional set of data chunks represented by a single sub-graph.

3. The method of claim 1, wherein identifying a subset of said set of data chunks to re-duplicate comprises finding a minimum set of data chunks that causes said set to exceed a single separate storage medium's storage capacity.

4. The method of claim 1, wherein identifying a subset of said set of data chunks to re-duplicate comprises finding a minimum set of data chunks represented by a particular sub-graph that causes the particular sub-graph to be connected if stored on at least one single separate storage medium.

5. The method of claim 1, wherein identifying a subset of said set of data chunks to re-duplicate comprises selecting a subset of said set of data chunks with high reference counts.

6. A computer program product of backing up data stored in a deduplicated file system to disjoint media while maintaining a deduplicated state and referential locality, said program product comprising a non-transitory computer readable storage medium having computer readable program code embodied therewith, said program code being executable by a computer to:

represent data files stored in a deduplicated filesystem as a bipartite graph of data chunks and file inodes, said represent such that a particular data chunk connected to a particular file inode in the bipartite graph represents that the particular data chunk is part of a file described by the particular file inode;

partition the bipartite graph into a plurality of sub-graphs with no interconnectivity between the sub-graphs using a graph partitioning algorithm, said partition such that each sub-graph represents: a set of data chunks, and all file inodes that include data chunks in said set of data chunks; and store the sets of data chunks and file inodes on storage media, said store such that all data chunks and file inodes represented by a single sub-graph are stored together on a single storage medium, and when the size of a particular set of data chunks and file inodes represented by a single sub-graph exceeds a single storage medium's storage capacity: identify a subset of data chunks in said particular set to re-duplicate such that partitioning a new bipartite graph into a plurality of new sub-graphs representing said subset such that each new sub-graph represents a set of data chunks for at least one complete file object that does not exceed a single separate storage medium's storage capacity, and re-duplicating data chunks represented by the new sub-graphs, and storing the re-duplicated data chunks on at least one single separate storage medium such that all data chunks represented by a single sub-graph among the new sub-graphs are stored together on at least one single separate storage medium.

7. The computer program product of claim 6, wherein store comprises storing each set of data chunks represented by a single sub-graph on at least one single separate storage medium until the at least one single separate storage medium does not have storage capacity to store at least one additional set of data chunks represented by a single sub-graph.

8. The computer program product of claim 6, wherein identify a subset of said set of data chunks to re-duplicate comprises finding a minimum set of data chunks that causes said set to exceed a single separate storage medium's storage capacity.

9. The computer program product of claim 6, wherein identify a subset of said set of data chunks to re-duplicate comprises finding a minimum set of data chunks represented by a particular sub-graph that causes the particular sub-graph to be connected if stored on at least one single separate storage medium.

10. The computer program product of claim 6, wherein identify a subset of said set of data chunks to re-duplicate comprises selecting a subset of said set of data chunks with high reference counts.

* * * * *